(12) United States Patent
Morris

(10) Patent No.: US 9,697,457 B2
(45) Date of Patent: *Jul. 4, 2017

(54) RFID TAG

(71) Applicant: CRYOGATT SYSTEMS LIMITED, Buxted (GB)

(72) Inventor: Geoffrey Morris, Buxted (GB)

(73) Assignee: Cryogatt Systems Limited, Buxted (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,639

(22) Filed: Aug. 19, 2016

(65) Prior Publication Data

US 2016/0358062 A1    Dec. 8, 2016

Related U.S. Application Data

(63) Continuation of application No. 14/762,672, filed as application No. PCT/GB2014/050178 on Jan. 23, 2014.

(30) Foreign Application Priority Data

Jan. 23, 2013    (GB) .................................. 1301188.7

(51) Int. Cl.
*G06K 19/06*    (2006.01)
*G06K 19/077*   (2006.01)
(Continued)

(52) U.S. Cl.
CPC .......... *G06K 19/07758* (2013.01); *B01L 3/00* (2013.01); *B01L 3/5082* (2013.01);
(Continued)

(58) Field of Classification Search
CPC .......... G06K 19/06; G06K 19/00; G06K 7/08; G06K 5/00; G06F 17/00
(Continued)

(56) References Cited

U.S. PATENT DOCUMENTS 7,070,053 B1    7/2006    Abrams et al.
8,937,550 B2    1/2015    Phaneuf et al.
(Continued)

FOREIGN PATENT DOCUMENTS

EP    0706825    4/1996
EP    2040201    3/2009
(Continued)

OTHER PUBLICATIONS

U.S. Appl. No. 14/762,672 , "Non-Final Office Action", Dec. 24, 2015, 10 pages.
(Continued)

*Primary Examiner* — Edwyn Labaze
(74) *Attorney, Agent, or Firm* — Kilpatrick Townsend & Stockton LLP

(57) ABSTRACT

An RFID tag for location inside a tubular base portion of a freestanding cryogenic vial, the RFID tag comprising: an RFID chip; an antenna connected to the chip; a support medium configured to support the chip and connected antenna; and a plug at least partially surrounding the chip, the antenna and the support medium, the plug being shaped to engage the tubular base portion of the vial. The RFID tag may be used to retrofit vials already stored at cryogenic temperatures.

23 Claims, 16 Drawing Sheets

(51) Int. Cl.
*G06K 19/08* (2006.01)
*B01L 3/00* (2006.01)
*G06K 19/04* (2006.01)

(52) U.S. Cl.
CPC ............ *B01L 3/545* (2013.01); *B01L 3/5453* (2013.01); *G06K 19/041* (2013.01); *G06K 19/06037* (2013.01); *G06K 19/0772* (2013.01); *G06K 19/07749* (2013.01); *G06K 19/07775* (2013.01); *G06K 19/08* (2013.01); *B01L 2300/022* (2013.01); *B01L 2300/0832* (2013.01); *B01L 2300/0851* (2013.01); *Y10T 29/4902* (2015.01)

(58) Field of Classification Search
USPC .......................... 235/492, 380, 487, 375, 451
See application file for complete search history.

(56) References Cited

U.S. PATENT DOCUMENTS

| | | | |
|---|---|---|---|
| 2005/0247782 A1 | 11/2005 | Ambartsoumian | |
| 2006/0180650 A1* | 8/2006 | Claessens | B65D 55/02 235/375 |
| 2011/0137812 A1 | 6/2011 | Sherga et al. | |
| 2011/0143452 A1 | 6/2011 | Che et al. | |
| 2011/0199187 A1 | 8/2011 | Davidowitz et al. | |
| 2013/0048711 A1 | 2/2013 | Burns et al. | |
| 2013/0106579 A1 | 5/2013 | Aubert et al. | |
| 2013/0119562 A1 | 5/2013 | Shimizu et al. | |
| 2013/0152710 A1 | 6/2013 | Laugharn, Jr. et al. | |
| 2013/0217107 A1 | 8/2013 | Pederson et al. | |
| 2014/0171829 A1 | 6/2014 | Holmes et al. | |
| 2015/0045782 A1 | 2/2015 | Ottanelli | |
| 2015/0125574 A1 | 5/2015 | Arent et al. | |
| 2015/0356398 A1 | 12/2015 | Morris | |

FOREIGN PATENT DOCUMENTS

| | | |
|---|---|---|
| EP | 2511857 | 10/2012 |
| WO | WO2006/130760 | 12/2006 |
| WO | WO2007/049039 A1 | 5/2007 |
| WO | WO2008/057150 A1 | 5/2008 |

OTHER PUBLICATIONS

U.S. Appl. No. 14/762,672 , "Notice of Allowance", Jul. 29, 2016, 7 pages.
U.S. Appl. No. 14/762,672 , "Notice of Allowance", May 6, 2016, 7 pages.
International Search Report & Written Opinion corresponding to the PCT/GB2014/050178 application.

\* cited by examiner

RFID TAG

CROSS-REFERENCE TO RELATED APPLICATIONS

This application is a continuation of Ser. No. 14/762,672, filed Jul. 22, 2015 which is a U.S. National Stage of PCT Application No. PCT/GB2014/050178, filed Jan. 23, 2014, which claims priority to GB Application No. 1301188.7, filed Jan. 23, 2013. Each of these applications is hereby incorporated by reference in its entirety for all purposes.

TECHNICAL FIELD

The present invention relates to an RFID tag for location inside a tubular base portion of a freestanding cryogenic vial.

BACKGROUND

Biological samples may be preserved by cryogenic freezing. The biological samples are usually stored in disposable containers (disposables). The type of disposable container used depends on the type of sample. Examples of commonly used disposable containers include vials, straws and bags. The disposable container is stored at low temperatures in a Dewar flask typically filled with liquid nitrogen at a temperature of −196° C.

Vials are generally tubular in shape, with a tubular wall defining a main longitudinal cavity (the sample cavity) for storage of the sample. The sample cavity can be sealed by a lid. Freestanding cryogenic vials include a base portion below the sample cavity which enables the vial to stand upright without the need for a support rack. The base portion of a freestanding vial is usually tubular in shape with a width that may be less than or equal to that of the sample cavity.

Conventional freestanding cryogenic vials have tubular base portions of a specific size and shape chosen by the vial manufacturer. A given laboratory will generally purchase vials from a particular manufacturer. Other laboratory equipment for storing, moving, filling and examining the vials will be chosen to be compatible with the specific size and shape of vial used in that laboratory. The tubular base portion of a conventional freestanding vial typically has a smooth cylindrical inner wall which extends around the entire circumference of the base portion. The tubular base portion generally has a circular cross section in the transverse direction.

Stored biological samples can be identified by writing on the disposable containers themselves or by writing on labels which are then attached to the containers. These labels may be handwritten or printed and can include bar codes.

The methods of identification described above have the disadvantage that written notes on containers can easily be erased or smudged and labels containing handwritten notes and printed text or barcode information can fall off the disposable containers while they are stored inside the Dewar leading to unidentifiable samples. These problems are exacerbated by the cold conditions in which biological samples must be kept.

When performing an audit of biological samples stored in cold storage at temperatures of −196° C.), the biological samples should not be allowed to warm up to a temperature greater than −130° C. It is therefore desirable to minimise the amount of time that a sample spends outside of the Dewar wherever possible.

Recording, monitoring and auditing of samples in cold storage takes a considerable amount of time and effort, even when samples are labelled using barcodes. An additional and undesirable increase in the time taken to record or audit samples arises as a result of frost which forms on the surfaces of disposable containers and their labels when they are removed from liquid nitrogen into relatively warmer temperatures. It is common for samples to be stored for many years (e.g. 15 years) but even after just one year in storage, the layer of frost which builds up on a disposable container can make it impossible to make an optical reading of a bar code on a label using a bar code reader because a layer of frost will block or diffract the light of the bar code reader. The container cannot be warmed up to remove frost as this would lead to destruction of the sample.

The frost can be wiped off the disposable container but this contributes to an undesirable increase in the amount of time taken to read the sample.

It is known that Radio Frequency ID (RFID) tags can be used to monitor a plurality of disposable containers stored at low temperatures of down to −196° C.

An RFID reader can be used to transmit an encoded radio signal to an RFID tag in order to interrogate it. Upon receiving the interrogation signal, the RFID tag transmits its identification information to the reader. This identification information may be a unique serial number assigned to a particular patient or to a particular sample.

In Europe and other countries outside of the US, RFID components for medical storage operate at an approved frequency of 13.56 MHz. It is important that the frequency used for the RFID tag does not lead to any undesirable interference with other electronic medical equipment. Lower medically approved frequency bands such as 125 KHz do not provide enough signal bandwidth to provide the tag with a useful user defined memory.

It is known that RFID tags may be attached to cryogenic vials in order to identify samples contained in the vials. US 2011/0199187 discloses RFID tags fixed to conventional freestanding vials using a tag/spring assembly as well RFID tags fixed to specially adapted vials. The bases of the specially adapted vials include features such as clips, tabs, bevelled edges, guides and stops required to locate and retain the RFID tag inside the base of the freestanding vial.

For the attachment of RFID tags to conventional freestanding vials, the tag/spring assembly must be fixed to the vial before the RFID tag can be fixed to the vial. This extra step adds undesirable time to the process of tagging the vials. In addition, the introduction of an extra component increases the risk that a component will fail resulting in the RFID tag falling out of the vial. For example, an assembly of separate parts clipped together and subjected to cryogenic temperatures of −196° C. can lead to stress failure.

The specially adapted vials are expensive to produce. Furthermore, in order to tag a sample which is already stored in a freestanding cryogenic vial under cryogenic conditions, the sample must be transferred from the conventional vial to the specially adapted vial. Transfer of the sample is impractical as it would involve warming the biological sample up to a liquid state which is undesirable.

STATEMENT OF INVENTION

Accordingly, the present invention aims to solve the above problems by providing, according to a first aspect, an RFID tag for location inside a tubular base portion of a freestanding cryogenic vial, the RFID tag comprising: an RFID chip; an antenna connected to the chip; a support medium configured to support the chip and connected antenna; and a plug at least partially surrounding the chip, antenna and support medium, the plug being shaped to engage the tubular base portion of the vial.

In this way, the plug of the RFID tag provides a quick and easy way to locate an RFID chip and antenna inside the tubular base portion of a conventional freestanding cryogenic vial without the need for complicated mechanical fixing mechanisms such as clips or springs.

In addition, there is no need for the vial to be adapted. The user can therefore use the same vials for tagged samples and untagged samples and can quickly and easily retrofit RFID tags to previously untagged samples thereby minimising the amount of time that the stored sample spends outside of the Dewar.

The support medium of the RFID tag preferably encapsulates the chip and antenna. A preferable method of fabrication includes bonding the RFID chip to an antenna and then subsequently encapsulating the connected chip and antenna with the support medium. The resulting encapsulated connection is strong and reduces the likelihood of a connection failure (and therefore failure of the RFID tag), particularly at cryogenic temperatures.

Reliability of the RFID chip may be enhanced for cryogenic application by ensuring that components are capable of functioning at the increased speeds at which electrons move when the chip is subjected to cryogenic temperatures of down to at least $-196°$ C. The RFID chip may be a CMOS device (Complementary Metal Oxide Semiconductor). Theoretical and experimental studies have shown that such chip designs function better at the cryogenic temperatures than alternative designs.

In this way the antenna and chip are protected from potential damage caused by direct contact with liquid nitrogen. Encapsulation of the chip and antenna also protects them from materials used during sterilisation of the vial such as ethylene oxide gas.

The support medium may be an epoxy resin. Preferably, the epoxy resin has a coefficient of expansion of less than 105 ppm/$°$ C. (below Tg).

In this way, it is possible to minimize the variation in size of the support medium over the range of temperatures used. This allows the RFID tag to be quickly and easily located inside the tubular base portion of the freestanding cryogenic vial at room temperature and then to remain in the same location after cooling to cryogenic temperatures of down to $-196°$ C.

Preferably, the epoxy resin has a coefficient of expansion within the range of 95-105 ppm/$°$ C. (below Tg).

The epoxy resin preferably has a high dielectric strength and is therefore a good insulating material. This means that the amount of radio frequency energy absorbed by the epoxy material during tag operation is reduced.

The epoxy resin preferably bonds to a wide variety of substances including silicon chips and copper wires and is preferably resilient to ethylene oxide gas and similar vapours and gases. In this way, the vial can be sterilised when the RFID tag is located inside the tubular base portion without damaging the support medium. An example of a suitable epoxy material is Tra-bond F123.

Preferably, the plug of the RFID tag comprises a cylindrical wall extending from a circular base. In this way, the RFID chip, antenna and support medium may be located on the circular base so that the RFID chip, antenna and support medium are partially surrounded by the cylindrical wall of the plug.

When the RFID tag is located inside the tubular base portion, the external surface of the plug forms a direct contact with the internal surface of the tubular base portion without the need for intricate surface structure. The plug is therefore simple and cost-effective to produce. Reliability of the RFID tag is increased because the plug does not require intricate fixing mechanisms that may fail.

Each off the external surface of the plug and the internal surface of the tubular base portion may be smooth.

Optionally, the external surface of the cylindrical wall may include at least one groove.

Each groove may be arranged such that, when the plug is located inside the tubular base portion, the groove forms an escape channel to allow cryogenic gas to escape from the tubular base portion. Each groove may be a longitudinal groove so that when the plug engages the tubular base portion, the grooves extend along the external surface of the cylindrical wall in a direction which is parallel to the longitudinal axis of the freestanding cryogenic vial.

Each groove may be a circumferential groove which extends around the circumference of the external surface of the plug. In this way the grooves can easily be engaged by protrusions which extend from the internal surface of the tubular base portion. The protrusions of the tubular base portion may be discrete protrusions (outwards "blips") located around the circumference of the internal surface. For example, the internal surface may comprise four discrete protrusions spaced at 90$°$ intervals.

Preferably, the plug is made from polypropylene. In this way, the plug can withstand cryogenic temperatures over periods of time of 15 years or more.

The plug may be welded to the tubular base portion to create a strong join between the plug body and the tubular base portion.

Laser welding may be used to attach the plug to the tubular base portion of the freestanding cryogenic vial. Optionally, the plug is black. A black plug facilitates the laser welding process because heat is more easily absorbed as compared to the same plugs made of lighter colours.

Plastic or solvent welding may be used to join the plug body to the tubular base portion at a mutual interface. This welding action can be used in conjunction with a polypropylene plug and polypropylene tubular base portion to produce a particularly strong join.

Other joining mechanisms could also be used, for example any suitable adhesive.

Where the plug includes grooves which form escape channels, the weld or adhesive is located at areas of the outer surface of the plug other than the groove regions. In this way, blockage of the escape channel grooves can be avoided.

The plug may include a 2D barcode. In this way, a single tag with a single plug can provide information via two methods; RFID tagging and barcode tagging. The presence of the 2D barcode in addition to the RFID chip leads to a tag that had a greater level of redundancy and is therefore more reliable.

Optionally, where the tubular base portion of the freestanding cryogenic vial is part of a single body that makes up the cryogenic vial, the plug of the RFID tag is shaped to engage the tubular base portion of the single vial body.

Optionally, where the tubular base portion of the freestanding cryogenic vial is located on an intermediate structure of the vial, the plug of the RFID tag is shaped to engage the tubular base portion on the intermediate structure.

The intermediate structure may be a jacket.

The tubular base portion of the cryogenic vial single body may have the same inner dimensions as the tubular base portion of the intermediate structure. In this way, the RFID tag is shaped such that it will engage both a tubular base portion of a single body freestanding cryogenic vial, and also a tubular base portion of an intermediate structure attached to a cryogenic vial.

According to a second aspect, the present invention provides an RFID tag comprising: an RFID chip and an antenna connected to the RFID chip; wherein the RFID chip and antenna are encapsulated in an epoxy resin, the epoxy resin having a coefficient of expansion of less than 105 ppm/° C. (below Tg).

In this way, it is possible to minimize the variation in size of the support medium over the range of temperatures used. This allows the RFID tag to be quickly and easily located inside the tubular base portion of the freestanding cryogenic vial at room temperature and then to remain in the same location after cooling to cryogenic temperatures of down to −96° C.

Preferably, the epoxy resin has a coefficient of expansion within the range of 95-105 ppm/° C. (below Tg).

The epoxy resin preferably has a high dielectric strength and is therefore a good insulating material. This means that the amount of radio frequency energy absorbed by the epoxy material during tag operation is reduced.

The epoxy resin preferably bonds to a wide variety of substances including silicon chips and copper wires.

The epoxy resin is preferably resilient to ethylene oxide gas and similar vapours and gases. In this way, the vial can be sterilised when the RFID tag is located inside the tubular base portion without damaging the support medium.

An example of a suitable epoxy material is Tra-bond F123.

According to a third aspect, the present invention provides a freestanding cryogenic vial having a tubular base portion, the freestanding cryogenic vial including an RFID tag of the first aspect or the second aspect.

The vial preferably includes a protrusion which extends from the inner surface of the tubular base portion into the tubular base portion; and the external surface of the plug of the RFID tag includes a groove arranged to align with the protrusion when the plug is located inside the tubular base portion to form a snap fit between the RFID tag and the vial.

In this way, the RFID tag can quickly and easily be located and secured inside the tubular base portion of the freestanding cryogenic vial by pushing the plug into the tubular base portion.

Preferably, the groove extends around the entire circumference of the plug.

According to a fourth aspect, the present invention provides a method of labelling a freestanding cryogenic vial with a tubular base portion, the method comprising the steps of:
  providing an RFID chip and antenna connected to the chip, the chip and antenna being supported by a support medium;
  attaching the supported RFID chip and antenna to a plug, the plug having an external surface which is comparable in circumference to the internal dimensions of the tubular base portion; and
  pushing the plug into the tubular base portion to form a fit between the plug and the tubular base portion.

The method may further comprise the step of laser welding the plug to the tubular base portion.

The step of attaching the supported RFID chip and antenna to the plug may comprise the step of using the plug as a mould into which the support medium is set around the chip and the antenna.

The method may further comprise the step of attaching an intermediate structure to the cryogenic vial, the intermediate structure including a tubular base portion which forms the tubular base portion of the freestanding cryogenic vial (i.e. in the case where an intermediate structure is attached to the vial, the "tubular base portion of the freestanding cryogenic vial" is actually a tubular base portion of this intermediate structure).

The intermediate structure may be a jacket.

The jacket may include a lid and may be attached to the original cryogenic vial by placing the original vial inside the jacket and screwing the lid (cap) on the top of the jacket. The jacket may have a tubular wall of a continuous construction, or a tubular wall with sides having openings.

The jacket wall may include labelling portions which could include barcodes, 2D barcodes or standard descriptive labels written by hand or by a computer.

The intermediate structure (such as a jacket) may be attached to cryogenic vials that may or may not have their own tubular base portion thereby providing a means for the RFID tag to be quickly and easily be fitted or retrofitted to label the cryogenic vial.

The method of labelling a freestanding cryogenic vial may be applied to a cryogenic vial which is already in use to retrofit the cryogenic vial with the RFID tag. This provides a quick and easy way of tagging samples that are already in use, whilst minimising the amount of time that the (already stored) sample spends outside of its storage position inside a Dewar According to a fifth aspect of the present invention, there is provided a jacket for a cryogenic vial in combination with the RFID tag of the first or second aspect.

The present invention will now be disclosed by way of example only, with reference to the accompanying figures, in which.

DETAILED DESCRIPTION

Figure 1:
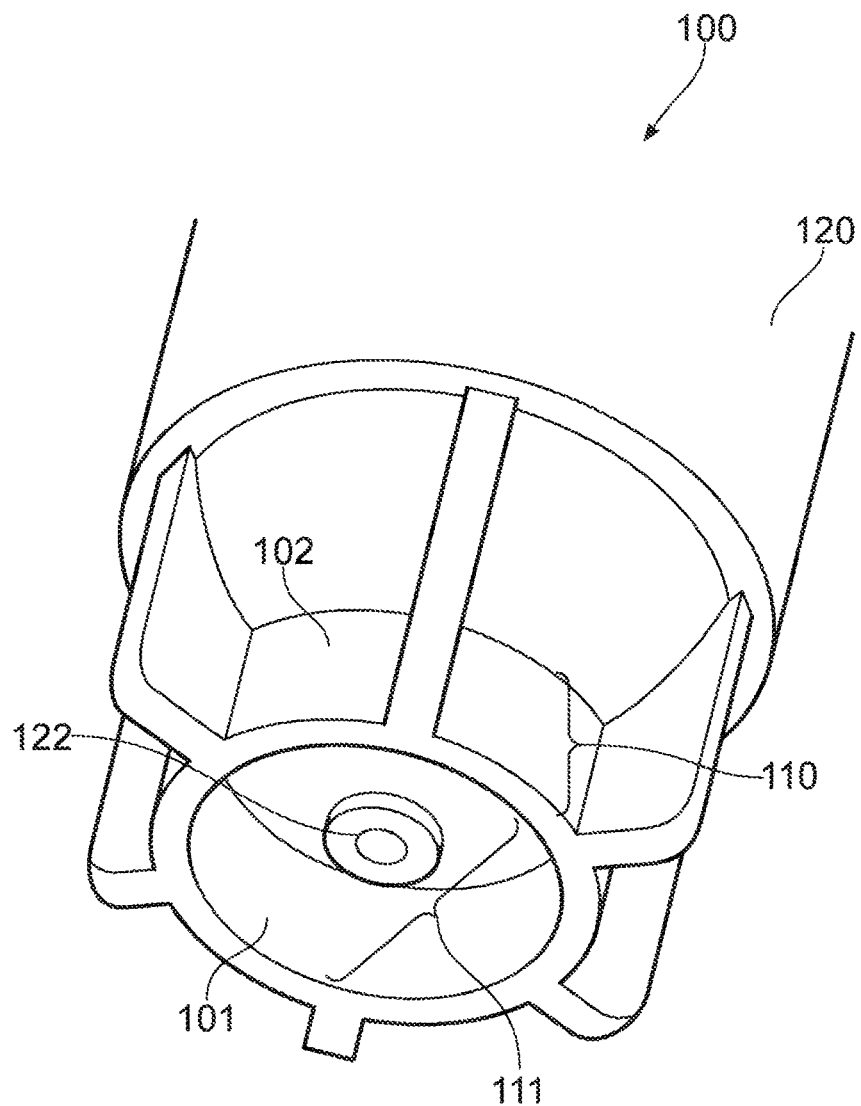
FIG. 1 shows a perspective view of part of a freestanding cryogenic vial having a tubular base portion.

FIG. 1 shows a part of a freestanding cryogenic vial 100 having a tubular base portion 110 and a sample cavity 120. The tubular base portion 110 forms a tubular base cavity 111 which is separate from the sample cavity 120.

In order to facilitate sample retrieval, the sample cavity has a rounded bottom 122 which protrudes into the cavity 111 of the tubular base portion 110. The tubular base portion 110 has an external surface 102 and an internal surface 101 which, along with the bottom 122 of the sample cavity, defines the size and shape of the tubular base cavity 111.

Figure 2:
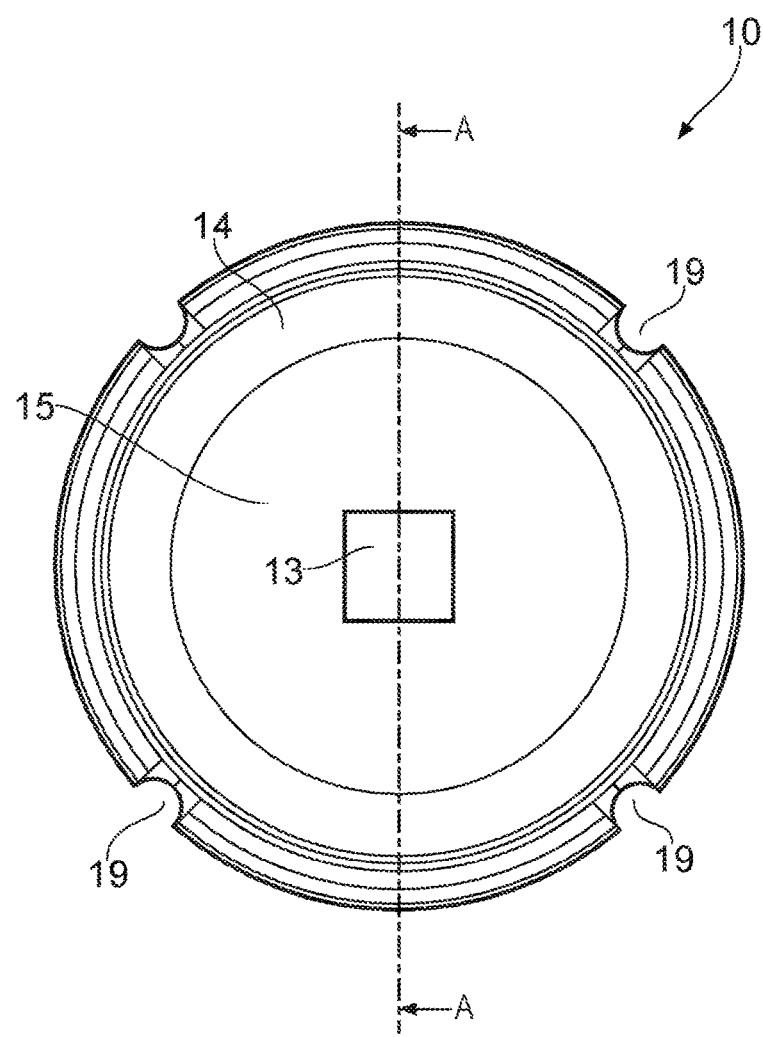
FIG. 2 shows a plan view of an RFID tag for location inside the tubular base portion of the freestanding cryogenic vial of FIG. 1.
Figure 3:
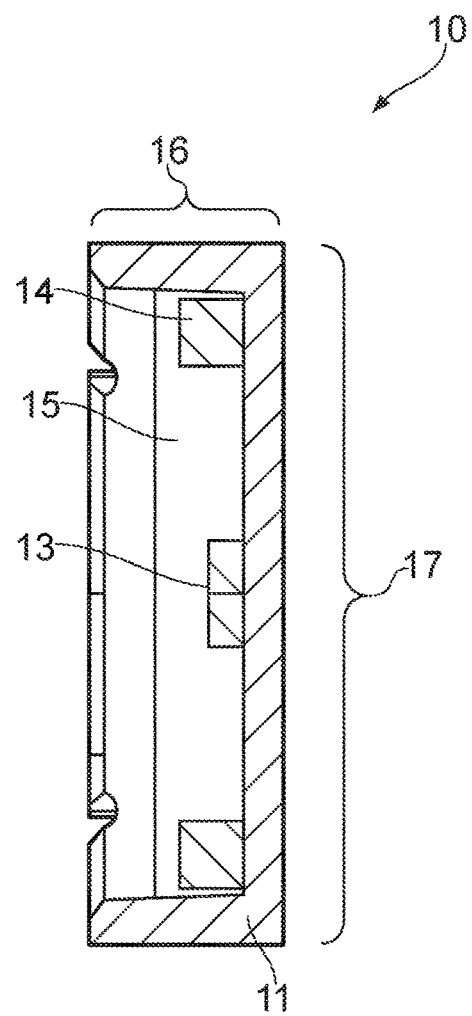
FIG. 3 shows a cross-sectional view of the RFID tag of FIG. 2 taken along the line A-A in FIG. 2.

FIG. 2 shows a plan view of an RFID tag 10 for location inside the tubular base portion 110 of the freestanding cryogenic vial 100 of FIG. 1. FIG. 3 shows a cross-sectional view of the same RFID tag 10 taken along section A-A (shown in FIG. 2) and FIG. 4 shows a side view of the same RFID tag 10.

Figure 4:
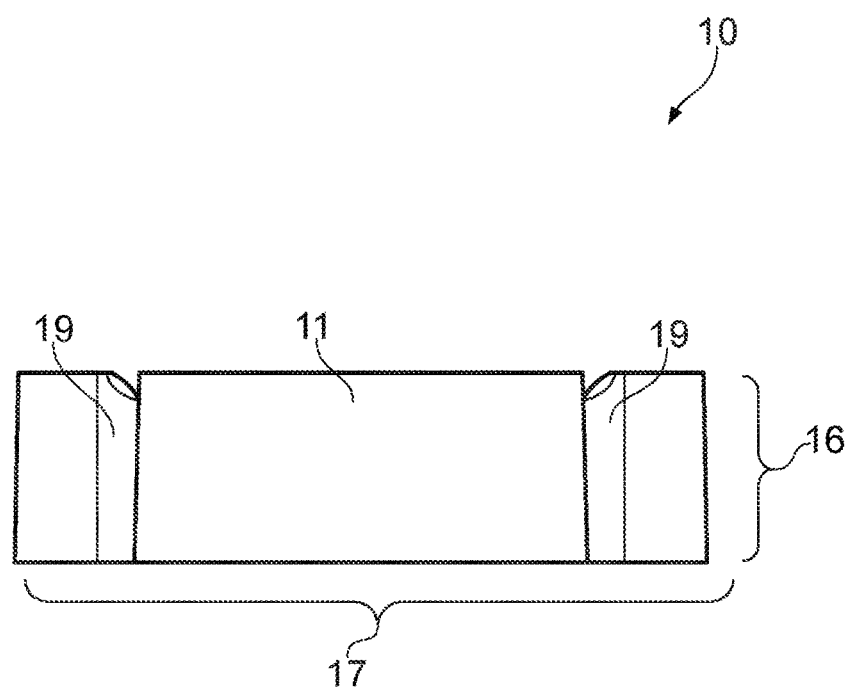
FIG. 4 shows a side view of the RFID tag of FIGS. 2 and 3.

Referring to FIGS. 2-4, the RFID tag 10 includes an RFID chip 13, an antenna 14 connected to the chip 13, and a support medium 15 which supports the chip and connected antenna in their connected configuration. The RFID tag 10 also includes a plug 11 which partially surrounds the chip, antenna and support medium.

In the embodiment of FIGS. 2-4, the support medium 15 is an encapsulating body which encapsulates the chip 13 and antenna 14. The encapsulating body takes the form of a solid disc.

Figure 5A:
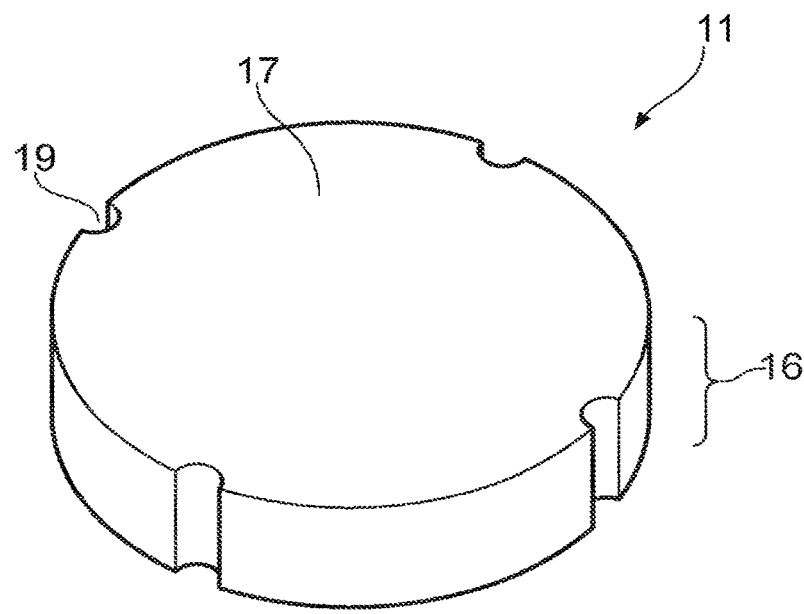
FIGS. 5a and 5b show perspective views of the plug of the RFID tag of FIGS. 2-4.
Figure 5B:
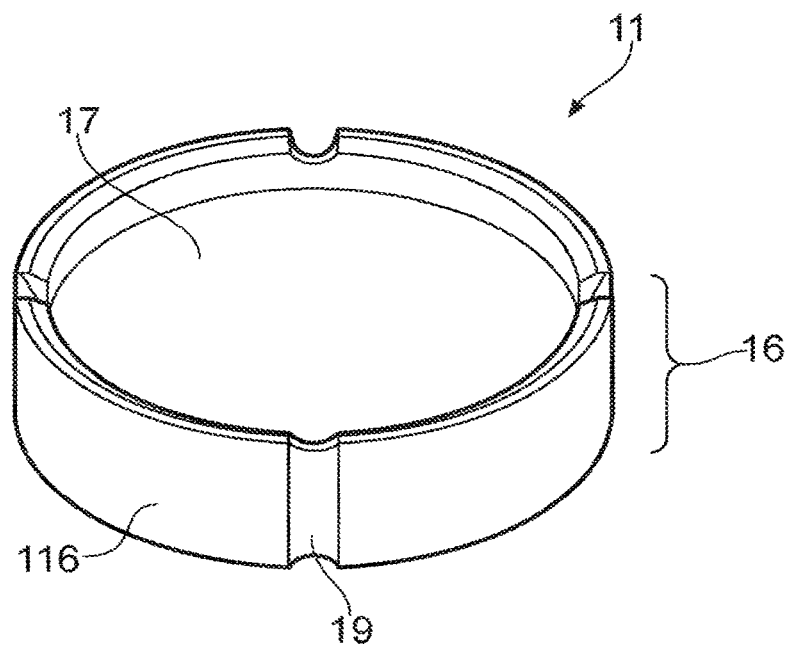

As shown in more detail in FIGS. 5a and 5b, the plug 11 partially surrounds the chip, antenna and support medium in that it comprises a circular base 17 and a cylindrical wall 16, the cylindrical wall extending upwards from the edges of the circular base 17. The top of the plug 11 is open. The cylindrical wall 16 of the plug 11 has an external surface 116 which is cylindrical in shape with four longitudinal grooves 19 extending from the open top to the circular base 17.

When the RFID tag is located inside the tubular base portion, the longitudinal grooves lie along a direction which is parallel to the longitudinal axis of the freestanding cryogenic vial. The longitudinal grooves are equidistant from one another, positioned at 0°, 90°, 180° and 270° around the circumference of the external surface 116.

Figure 6:
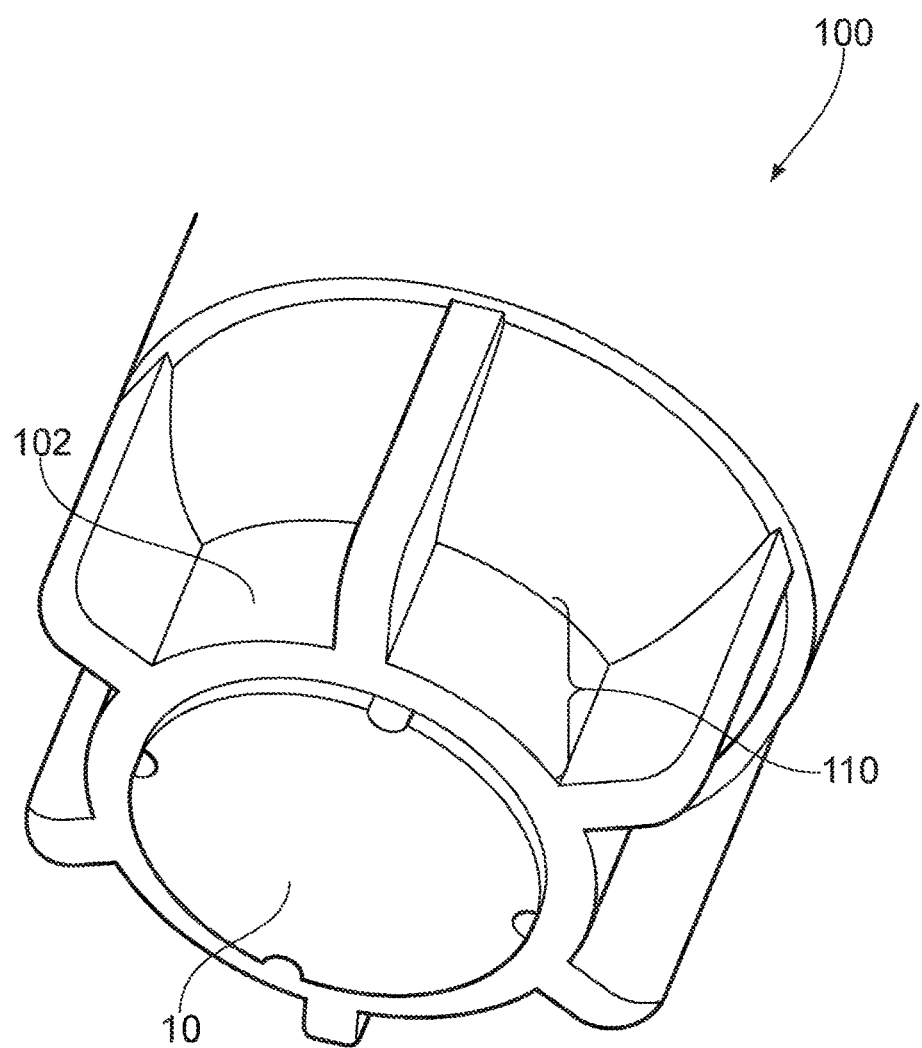
FIG. 6 shows a perspective view of a tubular base portion of the first freestanding cryogenic vial as shown in FIG. 1 with the RFID tag of FIGS. 2-5 located inside the tubular base portion.

FIG. 6 shows the freestanding cryogenic vial of FIG. 1 including the RFID tag 10 of FIGS. 2-5 located inside the tubular base portion 110. The external surface 116 of the plug 11 has a circumference which is comparable to the circumference of the internal surface 101 of the tubular base portion 110 in that the circumference of the internal surface of the tubular base portion 101 is greater than the circumference of the external surface 116 of the plug 11 but the difference between the two circumferences is not enough to allow free movement between the two surfaces. The RFID tan is therefore held inside the tubular base portion 110.

When the RFID tag is located inside of the tubular base portion 110, the external surface 116 of the plug 11 lies flush against the internal surface 101 of the tubular base portion around the entire circumference of the outer surface of the plug 11 with the exception of the locations of the longitudinal grooves 19.

The bottom 122 of the sample cavity 120 protrudes into the tubular base portion 101. The support medium may be shaped to include a concave portion (not shown) which is capable of accommodating the bottom 122 of the protruding sample cavity when the RFID tag is located inside the tubular base portion.

The plug 11 is black and is laser welded into position. The laser weld fuses the polypropylene plug to the polypropylene tubular base portion 101 resulting in a strong attachment. The black colour of the plug facilitates the laser welding process.

Figure 7:
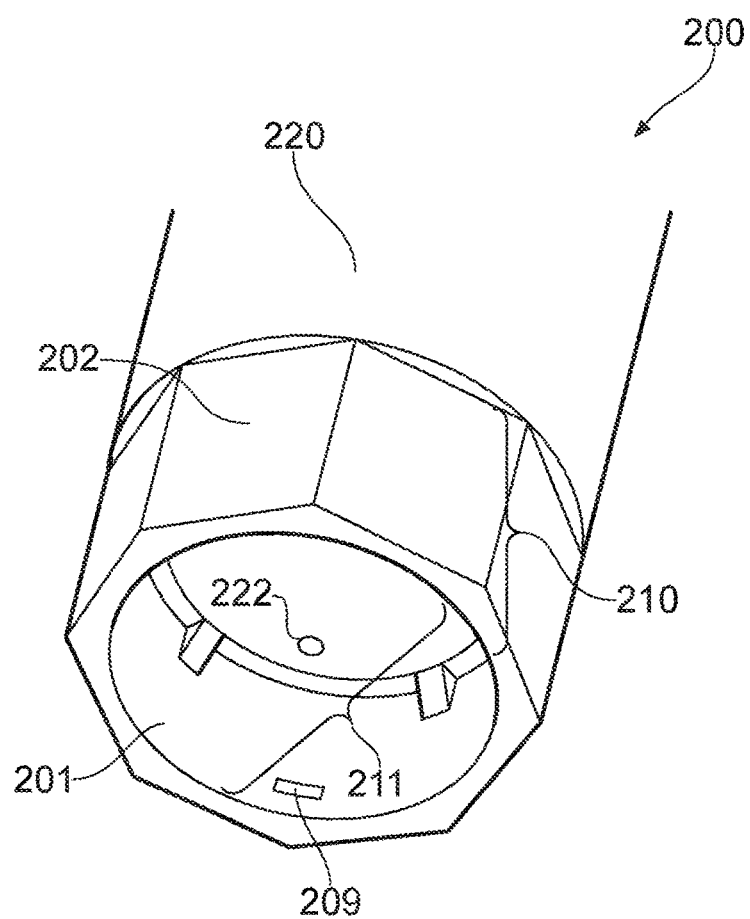
FIG. 7 shows a perspective view of part of an alternative freestanding cryogenic vial having a tubular base portion.

FIG. 7 shows a part of an alternative freestanding cryogenic vial 200 having a tubular base portion 210 and a sample cavity 220. The tubular base portion 210 forms a tubular base cavity 211 which is separate from the sample cavity 220.

In order to facilitate sample retrieval, the sample holding cavity 220 has a conical bottom 222 which protrudes into the cavity 211 of the tubular base portion 210. The tubular base portion 210 has an external surface 202 and an internal surface 201 which, along with the bottom of the sample cavity 222, defines the size and shape of the tubular base cavity 211.

Figure 8:
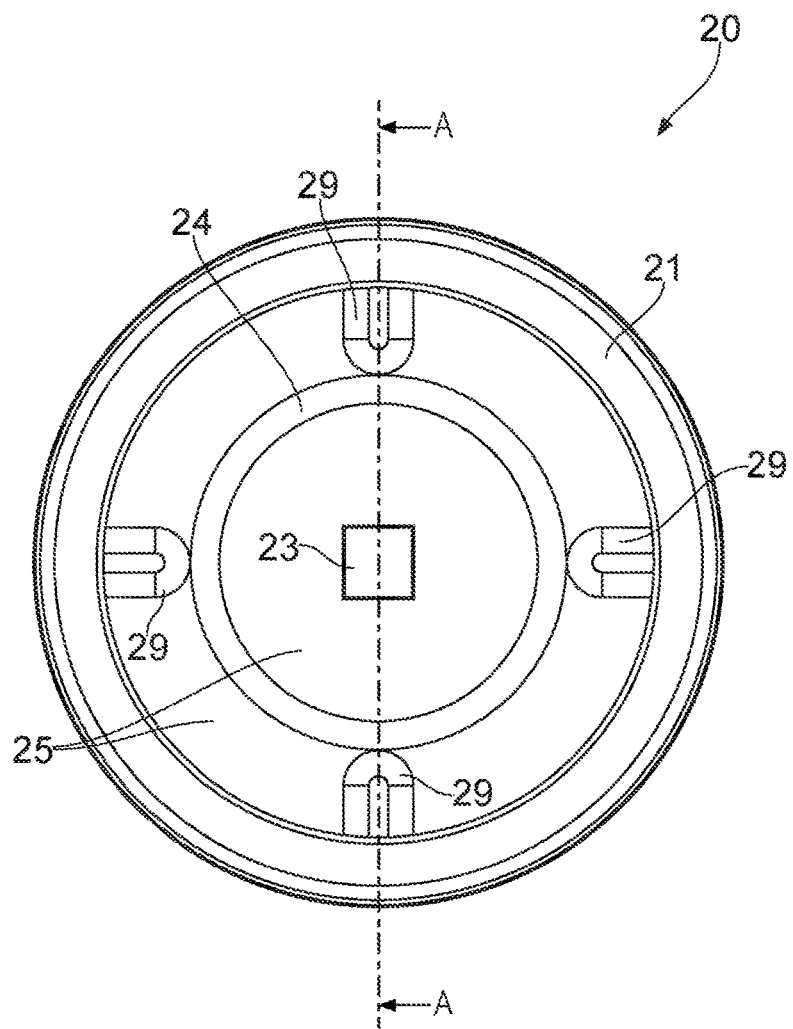
FIG. 8 shows a plan view of an RFID tag for location inside the tubular base portion of the freestanding cryogenic vial of FIG. 7.
Figure 9:
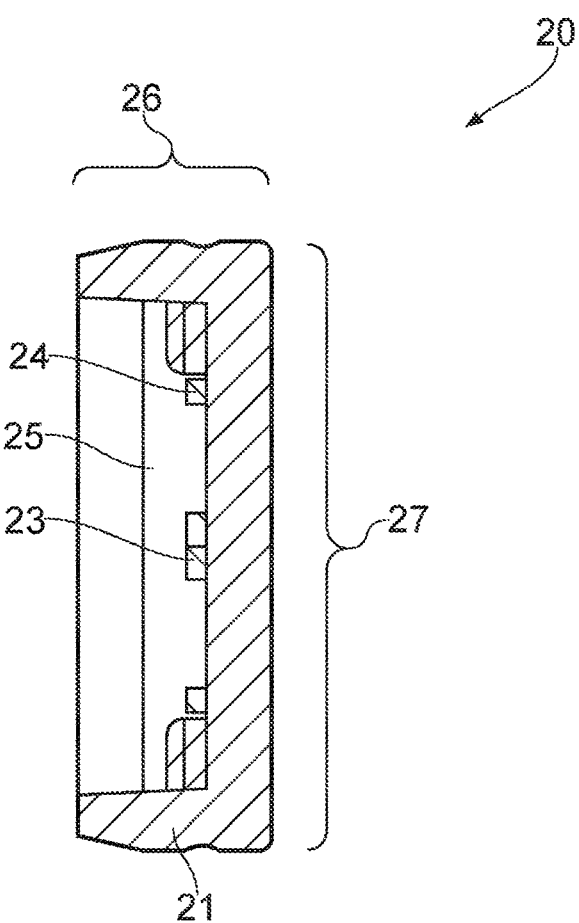
FIG. 9 shows a cross-sectional view of the RFID tag of Figure taken along the line A-A in FIG. 8.

FIG. 8 shows a plan view of an RFID tag 20 for location inside the tubular base portion 210 of the freestanding cryogenic vial 200 of FIG. 7. FIG. 9 shows a cross-sectional view of the same RFID tag 20 taken along section A-A (shown in FIG. 8) and FIG. 10 shows a side view of the same RFID tag 20.

Figure 10:
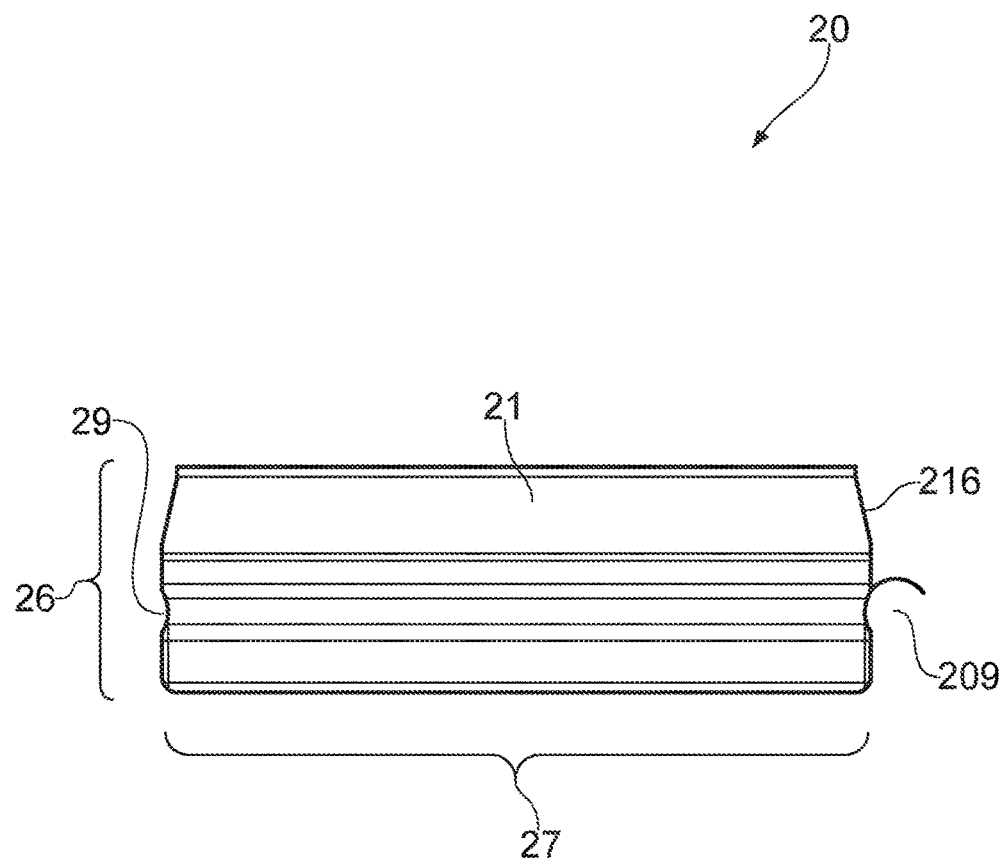
FIG. 10 shows a side view of the RFID tag of FIGS. 7-9.

Referring to FIGS. 8-10, the RFID tag 20 includes an RFID chip 23, an antenna 24 connected to the chip 23, and a support medium 25 which supports the chip and connected antenna in their connected configuration. The RFID tag 20 also includes a plug 21 which partially surrounds the chip, antenna and support medium.

In the embodiment of FIGS. 8-10, the support medium 25 is an encapsulating body which encapsulates the chip 23 and antenna 24. The encapsulating body takes the form of a solid disc.

Figure 11A:
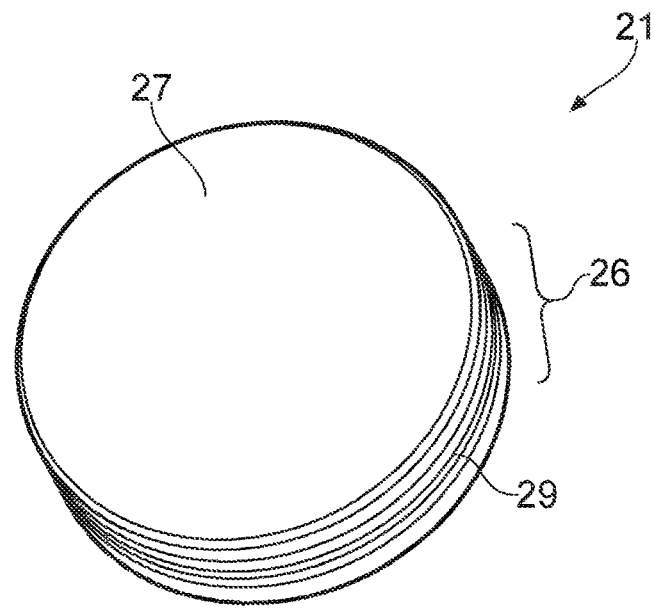
FIGS. 11a and 11b show perspective views of the plug of the RFID tag of FIGS. 7-10.
Figure 11B:
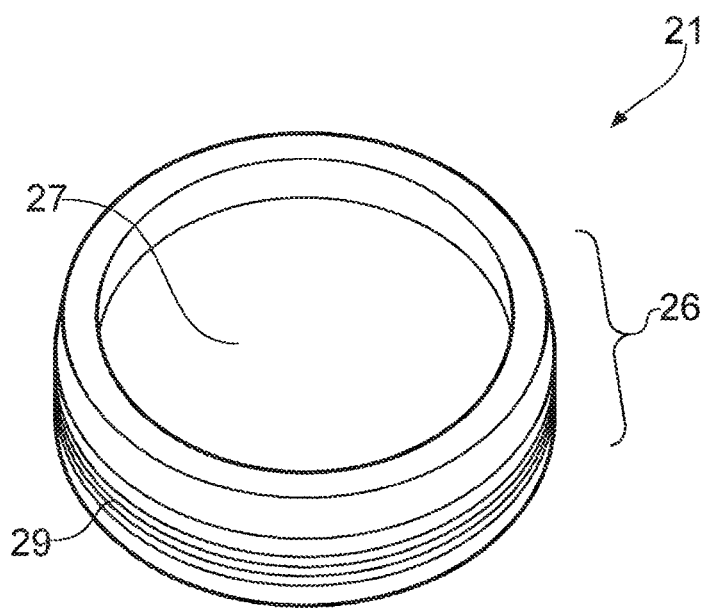

As shown in more detail in FIGS. 11a and 11b, the plug 21 partially surrounds the chip, antenna and support medium in that it comprises a circular base 27 and a cylindrical wall 26 which extends from the edges of the circular base 27 and an open top.

The cylindrical wall 26 of the plug 21 has an external surface 216 which is cylindrical in shape and includes a groove 29. The groove 29 is a circumferential groove extending around the circumference of the external surface 216 of the plug 21. The circumferential groove 29 enables the plug 21 to be easily engaged by one or more protrusions 209 (shown in FIG. 7) which extend from the inner surface 201 of the tubular base portion of the vial. In the embodiment shown in FIGS. 7, the protrusions are discrete protrusions (or "blips") located around the circumference of the internal surface of the tubular base portion. There are four discrete protrusions spaced at 90° intervals.

As shown in FIGS. 8 and 9, the plug 21 includes guide structures 290. The guide structures being configured to position the RFID chip 23 and antenna 24 in the centre of the plug 21 so that the coil of the antenna 24 is located at the centre of the circular base 27. This ensures that when the RFID tag is scanned by an RFID reader the centre of the coil of the RFID antenna will be aligned with the reader when the centre of the vial is aligned with the reader. In the embodiment shown in FIGS. 8 and 9, there are 4 guide structures spaced at 90° intervals to form two pairs of opposing structures. Each of the guide structures 290 is U-shaped and protrudes from the cylindrical wall of the plug inwards to the centre of the plug.

Figure 12:
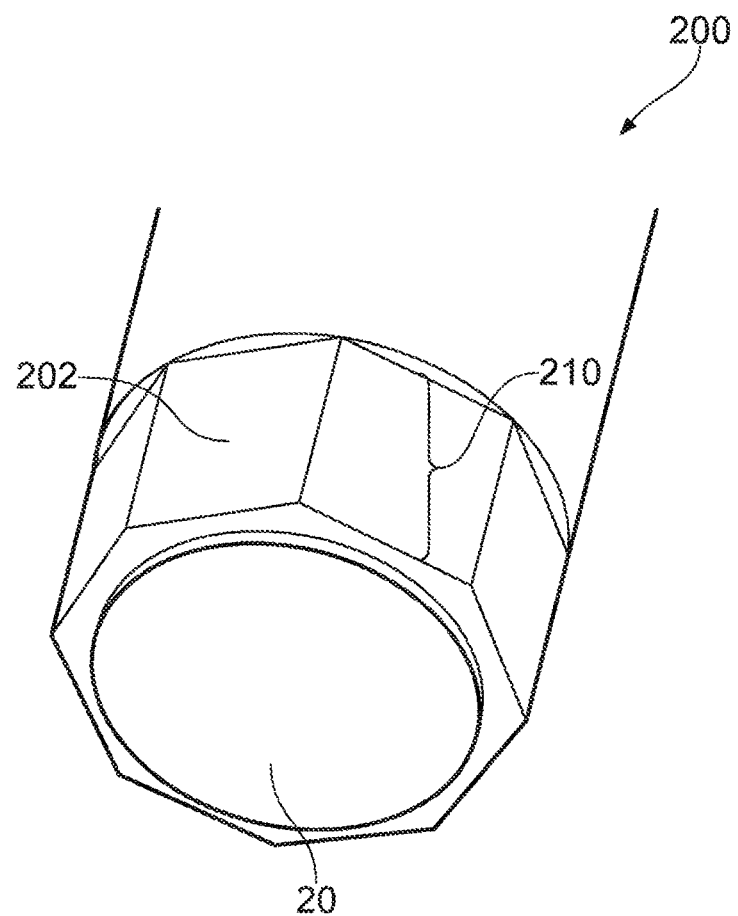
FIG. 12 shows a perspective view of a tubular base portion of the second freestanding cryogenic vial as shown in FIG. 7, with the RFID tag of FIGS. 8-11 located inside the tubular base portion.

FIG. 12 shows the freestanding cryogenic vial of FIG. 7 including the RFID tag 20 of FIGS. 8-11 located inside the tubular base portion 210. The external surface 216 of the plug 21 has a circumference which is comparable to the circumference of the internal surface 201 of the tubular base portion 210 in that the circumference of the internal surface of the tubular base portion 201 is greater than the circumference of the external surface 216 of the plug 11 but the difference between the two circumferences is not enough to allow free movement between the two surfaces.

The bottom 222 of the sample cavity 220 protrudes into the tubular base portion 201. The support medium may be shaped to include a concave portion (not shown) which is capable of accommodating the bottom 222 of the protruding sample cavity when the RFID tag is located inside the tubular base portion.

Figure 13:
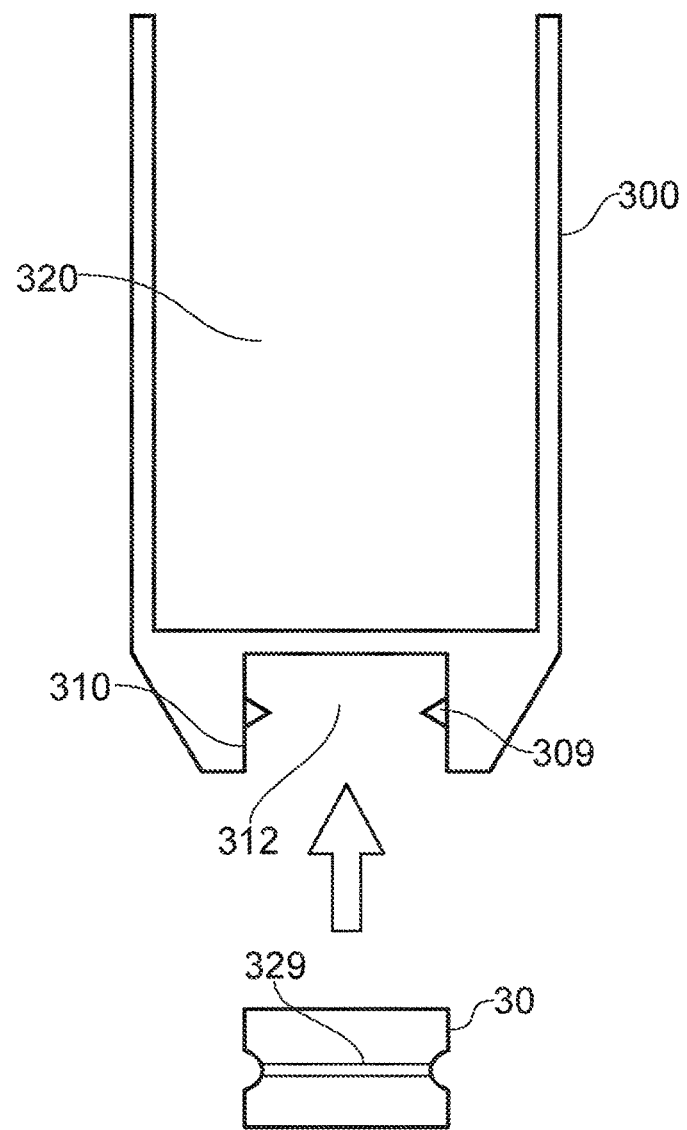
FIG. 13 shows an exploded side view of the RFID tag and a jacket.
Figure 14:
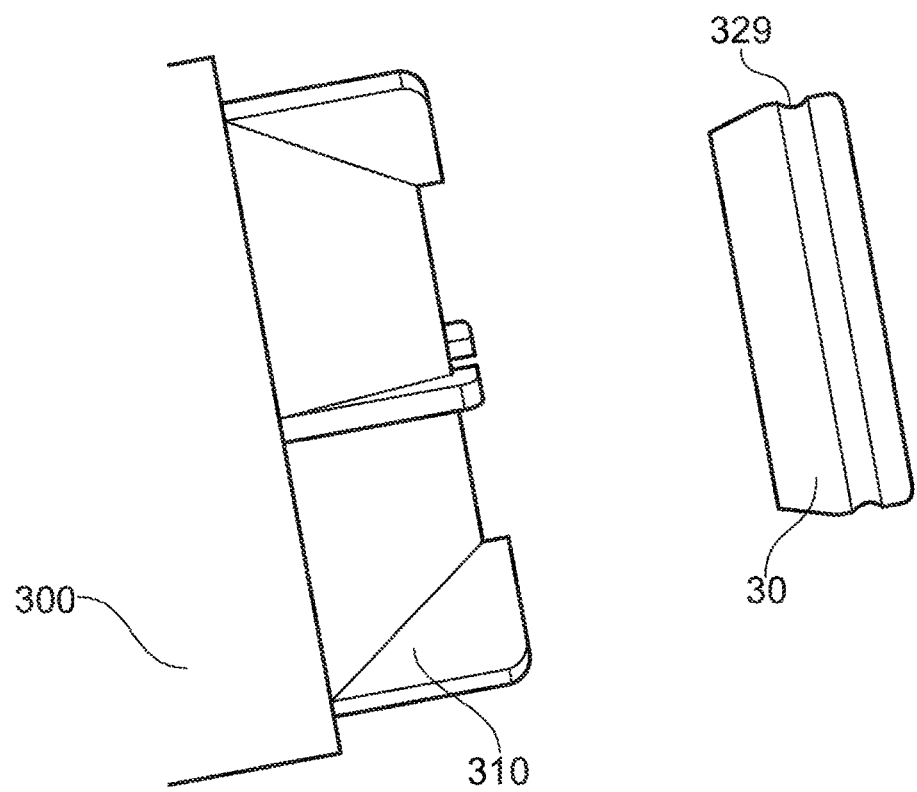
FIG. 14 shows an enlarged exploded side view of the RFID tag and a jacket.

FIGS. 13 and 14 show a part of a freestanding cryogenic vial in the form of a jacket 300 having a tubular base portion 310 in combination with an RFID tag 30 which is configured to engage the tubular base portion 310.

The jacket is described below in relation to the RFID tag described in relation to FIGS. 8 to 12. However a jacket could also be used in conjunction with the RFID tag which is described in relation to FIGS. 2 to 6.

A jacket receiving portion 320 is defined by the walls of the jacket, and the cryogenic vial is locatable within this receiving portion. In this way, the jacket 300 is configured to be capable of attachment to a cryogenic vial so that it surrounds the body of the cryogenic vial and therefore its sample cavity.

The base of the jacket includes a tubular base portion 310 which forms a tubular base cavity 312 that is a separate structure, but is attached to the actual body of the cryogenic vial (the actual body of the cryogenic vial being that which defines the sample cavity).

The jacket may surround the entirety of the body of the cryogenic vial. A cap (not shown) can be screwed onto the top of the jacket once the cryogenic vial is inside the jacket receiving portion 320. This provides a simple and time efficient way of tagging the vial, which is particularly important when retrofitting a vial which is already in use in cryogenic storage.

Figure 15:
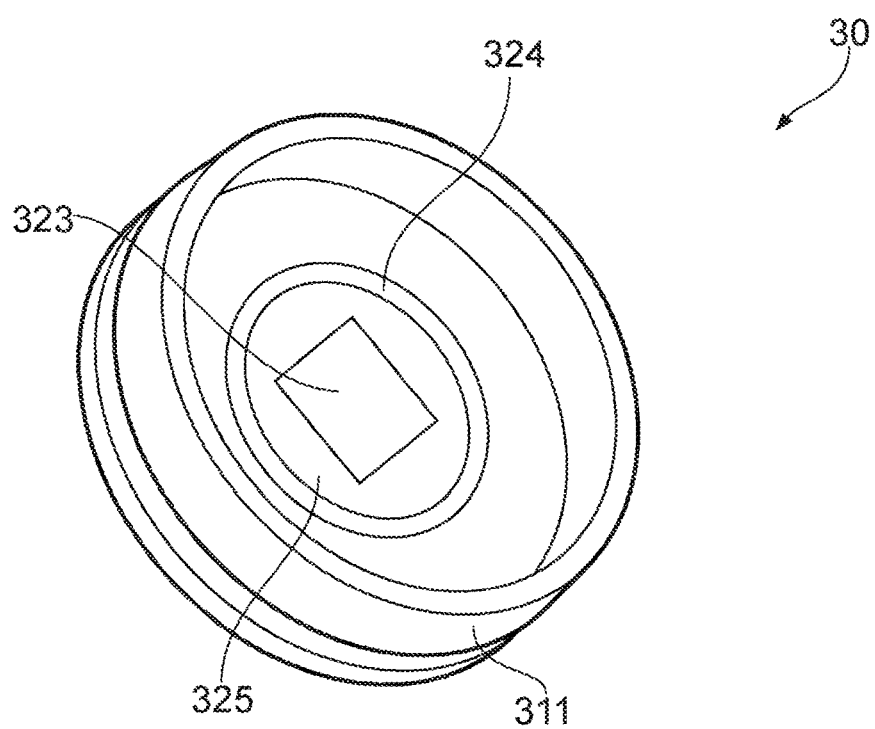
FIG. 15 shows an embodiment of the RFID tag for engaging the tubular base portion of a jacket for a vial.
Figure 16:
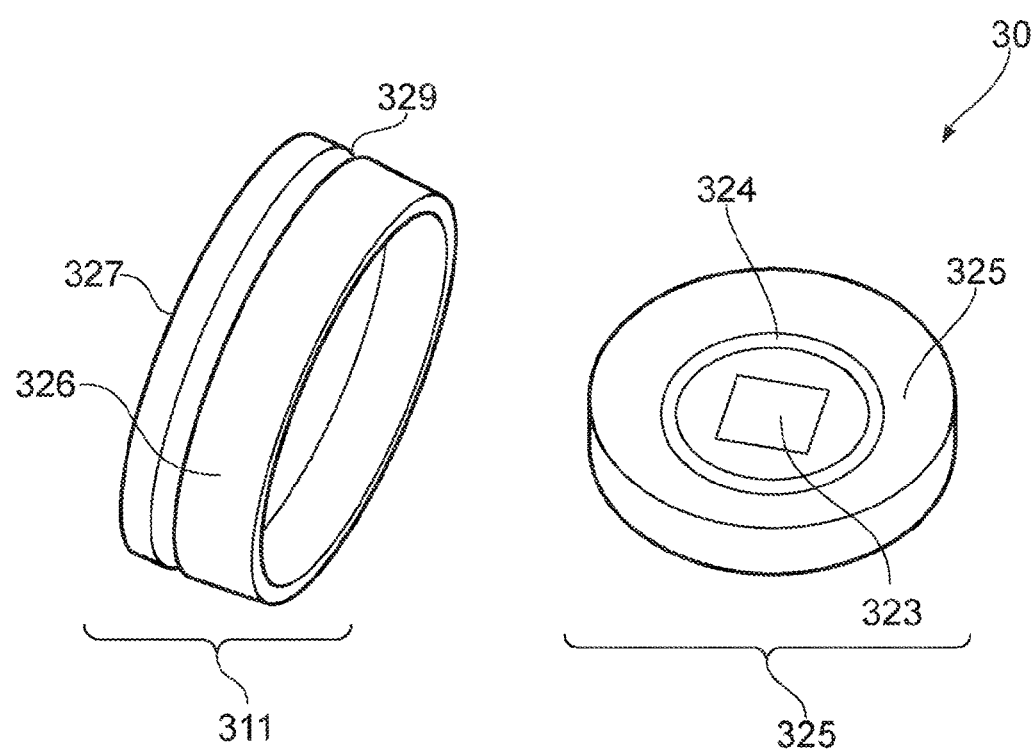
FIG. 16 shows an exploded view of the RFID tag.

FIGS. 15 and 16 show an RFID tag 30 for location inside the tubular base portion 310 of the freestanding cryogenic vial 300 of FIGS. 13 and 14. The RFID tag 30 includes an RFID chip 323, an antenna 324 connected to the chip 323, and a support medium 325 which supports the chip and connected antenna in their connected configuration. The RFID tag 30 also includes a plug 311 which partially surrounds the chip, antenna and support medium.

In the embodiment of FIGS. 15 and 16, the support medium 325 is an encapsulating body which encapsulates the chip 323 and antenna 324. The encapsulating body takes the form of a solid disc. The plug 311 partially surrounds the chip, antenna and support medium in that it comprises a circular base and a cylindrical wall, the cylindrical wall extending upwards from the edges of the circular base 327.

As shown in FIG. 16, the plug 311 has an external surface 326 which has a circumference which is comparable to the circumference of the internal surface of the tubular base portion 310 of the intermediate structure 300 in that the circumference of the internal surface of the tubular base portion 310 is greater than the circumference of the external surface 326 of the plug 311, but the difference between the two circumferences is not enough to allow free movement between the two surfaces. The RFID tag 30 is therefore held inside the tubular base portion 310.

The plug 311 includes a circumferential groove 329 which extends around the circumference of the external surface of the plug. In this way, the grooves can easily be engaged by protrusions 309 which extend from the internal surface of the tubular base portion to advantageously enable a "snap fit". The top of the plug 311 is open which facilitates fitting of the chip, antenna and support medium into the plug 311.

In all of the embodiments described in this document, the plug may be used as a mould during production into which the chip and antenna can be placed. The support medium can then be added, for example in the form of an epoxy, which will then set to the shape of the inner dimensions of the plug and encapsulate the chip and antenna. In the embodiment shown in FIG. 16, the support medium 325 of the tag containing the chip and antenna is shown after being removed from the plug.

The foregoing description of the preferred embodiments of the invention have been presented for purposes of illustration and description, it is not intended to be exhaustive or to limit the invention to the precise form disclosed, and modifications and variations are possible in light of the above teachings.

For example: the support medium may be polypropylene; an adhesive may be used to secure the plug to the tubular base portion; and the plug may completely surround the chip, antenna and support medium.

It is intended that the scope of the invention be defined by the claims appended hereto.

The invention claimed is:

1. An RFID tag comprising:
an RFID chip;
an antenna connected to the RFID chip;
a support medium configured to support the RFID chip and antenna; and
a plug at least partially surrounding the RFID chip, antenna and support medium, the plug being shaped to engage a tubular base portion of a freestanding cryogenic vial, wherein an external surface of the plug is comparable in circumference to an internal dimensions of the tubular base portion such that the external surface of the plug forms a direct contact with an internal surface of the tubular base portion to prevent free movement therebetween.

2. The RFID tag according to claim 1, wherein the external surface of the plug is smooth.

3. The RFID tag according to claim 1, wherein the support medium encapsulates the RFID chip and antenna.

4. The RFID tag according to claim 1, wherein the support medium is an epoxy resin.

5. The RFID tag according to claim 4, wherein the epoxy resin has a coefficient of expansion of less than 105 ppm/° C. (below Tg).

6. The RFID tag according to claim 1, wherein the plug comprises a cylindrical wall extending from a circular base.

7. The RFID tag according to claim 6, wherein the cylindrical wall has the external surface of the plug and a second internal surface; and wherein the external surface of the cylindrical wall includes at least one groove.

8. The RFID tag according to claim 7, wherein, when the plug is located inside the tubular base portion, the at least one groove forms a channel to allow cryogenic gas to escape from the tubular base portion.

9. The RFID tag according to claim 8, wherein the external surface of the plug lies flush against the internal surface of the tubular base portion around an entire circumference of the external surface of the plug with an exception of a location of each of the at least one groove when the plug is fitted within said tubular base portion.

10. The RFID tag according to claim 8, wherein each of the at least one groove lies along a direction which is parallel to a longitudinal axis of the freestanding cryogenic vial.

11. The RFID tag according to claim 10, wherein the at least one groove includes a plurality of grooves that are equidistant from one another, positioned at 0°, 90°, 180°, and 270° around an circumference of the internal surface.

12. The RFID tag according to claim 7, wherein each of the at least one groove extends around a circumference of the external surface of the cylindrical wall of the plug.

13. The RFID tag according to claim 1, wherein the plug includes polypropylene.

14. The RFID tag according to claim 1, wherein the plug is black.

15. The RFID tag according to claim 1, wherein the plug includes a 2D barcode.

16. The RFID tag according to claim 1, wherein the tubular base portion of the freestanding cryogenic vial is part of a single body that makes up the freestanding cryogenic vial; and
wherein the plug is shaped to engage the tubular base portion of the single body.

17. The RFID tag according to claim 1, wherein the tubular base portion of the freestanding cryogenic vial is located on an intermediate structure of the freestanding cryogenic vial; and
wherein the plug is shaped to engage the tubular base portion on the intermediate structure.

18. The RFID tag according to claim 17, wherein the intermediate structure is a jacket.

19. A system comprising:
a freestanding cryogenic vial; and
a RFID tag comprising:
an RFID chip;
an antenna connected to the RFID chip;
a support medium configured to support the RFID chip and antenna; and
a plug at least partially surrounding the RFID chip, antenna and support medium, the plug being shaped to engage a tubular base portion of a freestanding cryogenic vial, wherein an external surface of the plug is comparable in circumference to an internal dimensions of the tubular base portion such that the external surface of the plug forms a direct contact with an internal surface of the tubular base portion to prevent free movement therebetween,
wherein the RFID tag is located within the tubular base portion of the freestanding cryogenic vial.

20. A method comprising:
providing a supported structure, the supported structure comprising:
an RFID chip; and
an antenna connected to the RFID chip; and
a support medium that supports the RFID chip and the antenna;
attaching the supported structure to a plug, the plug being shaped to engage a tubular base portion of a freestanding vial, wherein an external surface of the plug is comparable in circumference to an internal dimensions of the tubular base portion; and
pushing the plug into the tubular base portion of the freestanding vial such that the external surface of the plug forms a direct contact with an internal surface of the tubular base portion to prevent free movement therebetween.

21. The method of claim 20, further comprising:
laser welding the plug to the tubular base portion.

22. The method of claim 20, further comprising:
attaching an intermediate structure to the freestanding vial, the intermediate structure including an intermediate-structure tubular base portion which forms the tubular base portion into which the plug is fitted.

23. The method of claim 20, wherein the freestanding vial with the tubular base portion into which the plug is pushed includes a cryogenic vial containing a sample, such that the cryogenic vial is retrofitted with the RFID chip.

\* \* \* \* \*